3,211,679
ANTIFOULING COMPOSITIONS COMPRISING
TRIPHENYLBORANEAMINE COMPLEXES
David M. Updegraff, North Oaks Village, Minn., assignor to Minnesota Mining and Manufacturing Company, St. Paul, Minn., a corporation of Delaware
No Drawing. Filed Apr. 25, 1961, Ser. No. 105,508
9 Claims. (Cl. 260—19)

This invention relates to compositions adapted to the prevention of marine fouling, and particularly to paints for structures immersed in sea water. It is a continuation-in-part of my copending application, Serial Number 793,948, filed February 18, 1959, now abandoned.

The problem of the fouling of marine structures has been recognized for many years (cf. Protective and Decorative Coatings, J. J. Mattiello, vol. III, Chapter 12B, John Wiley and Sons, Inc., New York, 1943). Stationary structures such as piers, wharves and the like become encrusted with organisms below the water line and are unsightly. The problem with moving structures such as boats and barges of all types is more serious since not only are they made unsightly by the algal growth which occurs near the water line, but, of even greater significance, the extensive growth on the submerged part of the hull results in increased resistance to movement through the water and a consequent waste of power. Furthermore, the calcareous shells of the barnacles may cause breakage of the protective paint film and open the way for corrosion of metal hulls or invasion of wooden hulls by one or more of the numerous marine borers which abound in some waters and weaken wooden structures. This latter problem furthermore extends to stationary structures and is exacerbated by the difficulty of cleaning such structures at regular intervals; which can be done for vessels by drydocking, scraping and repainting. It is well recognized that fouling in its broad sense is a serious problem which leads to economic loss throughout the world.

Prior art compositions have suffered from the fact that most such compositions, while they are eventually toxic to the fouling organisms, they do not wholly prevent the attachment of the "cypris" larvae. This is the stage in the development of the larva of the barnacle at which it is capable of attachment. As a result, the barnacle grows for a greater or lesser time and then dies, leaving a calcareous plate attached to the submerged structure. This provides a roughened surface which increases friction in the water and serves as a secondary base for further attachment of organisms, which are at least to some extent protected from the anti-fouling paint thereby. Thus, although many prior art compositions have shown useful inhibition of fouling, they have not fully prevented it. It is also a characteristic of the prior art paints, nearly all of which contain cuprous oxide, that they have a dark color, which prevents their being manufactured in aesthetically pleasing lighter hues. Furthermore, these paints (i.e., those which are copper- or cuprous oxide-based) aggravate the corrosion of steel hulls and the corrosion products counteract their anti-fouling activity.

It is an object of the present invention to provide marine antifouling compositions which, in addition to preventing the fouling of submerged structures for extended periods of time, may be prepared in the lighter colors and do not aggravate the corrosion of steel hulls. It is another object of this invention to provide a method for the prevention of fouling of marine structures. A further object is to provide compositions for application to marine structures to prevent fouling. Other objects will become evident hereinafter.

In accordance with these and other objects of this invention, it has been found that compositions which provide substantially complete protection from marine fouling are obtained by incorporating an effective amount, not less than about 25% by weight, of a complex of triphenylborane with a compound selected from the group consisting of heterocyclic amines of the formula:

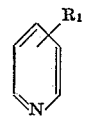

wherein $R_1$ is selected from the class consisting of meta and para oriented hydrogen, halogen, lower alkyl, amide, carbocyclic and heterocyclic groups, and aliphatic amines of the formula $$R_2NH_2$$

wherein $R_2$ is an aliphatic hydrocarbon group containing from about four to twenty carbon atoms, in a substantially water-insoluble film forming vehicle.

These amine complexes are, broadly speaking, known compounds and may be prepared by known methods e.g. by preparing an ether solution of the triarylborane and introducing the desired amine. The complexes appear to form in mol-for-mol proportions and, ordinarily, there is immediate precipitation of the ether-insoluble complex. The preparation is carried out in the absence of air. Specific directions for the preparation of the complexes of triphenylborane are set forth in Berichte, volume 57B, page 813, ff., 1924. The following descriptions, including uncorrected melting points where available, of a number of these complexes will serve to characterize them and are generally illustrative of the triphenylborane-amine complexes useful in the compositions of the invention.

| Complex of triphenylborane with: | Melting point or appearance |
|---|---|
| Methyl amine ° C | 195–213 |
| Dodecyl amine | Tan grease |
| n-Tetradecyl amine | Tan oil |
| Pyridine ° C | 182–202 |
| Bis(4-pyridyl)glycol ° C | 173–181 |
| γ-Picoline ° C | 135–145 |

Other amines which form complexes with triphenylborane useful in the invention are 3-bromo pyridine, 4-ethyl pyridine, 4-butyl pyridine, pyridine-3-carboxylic acid diethylamide, isonicotinic acid diethylamide, isonicoteine, 4-(4-pyridyl)-piperidine, n-butylamine, decylamine, dodecylamine, n-tetradecylamine, octadecylamine, etc.

Suitable film-forming vehicles are paints and varnishes, such as spar varnish or vinylacetate-vinyl chloride copolymer based paints, and the like. The triphenylborane-amine complex is preferably added as a finely divided dry powder, as a liquid, or as a suspension in a suitable diluent and is readily dispersed in the vehicle, which may be referred to as a marine paint, for convenience. As the active material must be slowly released from the exposed surface of the submerged antifouling paint film, the vehicle must be sufficiently permeable so that the triphenylboraneamine complex will slowly become available. As is known in the art, the addition of certain materials, e.g., rosin, assists in increasing the permeability of the film and thereby serves to control the rate of diffusion of the toxicant. More permeable films will, other things being equal, result in a relatively shorter period of protection.

The triphenylborane-amine complexes are generally substantially insoluble in the marine paints and tend to remain suspended, to a large extent, as fine crystalline or liquid particles, thus acting as a pigment to a certain extent. Toxicant particle sizes averaging about 50 to 200 mesh or finer can be used. Other normal ingredients for a paint mixture such as thinner, drier, thickener, pigment, dyes and the like can be added to the composition if desired, and have no adverse effect so far as can be determined so long as the concentration of the triphenylborane-amine complex is above the minimum effective concentration and the permeability of the particular base is not adversely affected. Preferably, the triphenylborane-amine complex is used in an amount sufficient so that it will make up from about 40 to 90 percent of the weight of the dry paint film or about 25 to 50 percent of the total weight of the liquid paint composition.

It is not known with certainty whether the triphenylborane complexes of the invention are effective against fouling organisms as repellents, toxicants, or both, although they are sometimes referred to herein, for convenience as toxicants or as active ingredients. Panels coated with compositions of this invention and exposed for periods of several months to severe fouling conditions in the ocean near Miami, Florida, show no observable fouling. Under comparable conditions, untreated control panels become heavily encrusted with barnacles and panels coated with commercial anti-fouling compositions also exhibit a degree of fouling, having some barnacles attached to them.

The paint-like compositions of the present invention are applied by brushing, spraying, rolling or by any other method as desired, as the final coating for surfaces exposed to fouling. They can be applied over other paint if desired. Thus, application of one or more priming and corrosion-resisting coatings may be followed by one or more coatings of the compositions of the invention. In making the application, the normal procedures of cleaning and priming the surfaces are carried out and the anti-fouling coating is applied last. Two or more coatings may be applied if desired but this is generally not necessary if thorough coverage of the surface is effected with one coat.

The triphenylborane-amine complexes may be used as toxicants in the various anti-fouling paint vehicles including exfolidating or submerged "chalking" types, in which the surface is deliberately loaded with inert fillers to control the water permeability of the film and promote chalking (e.g., see Young G. H., Schneider, W. K., and Scagren, G. W., Industrial and Engineering Chemistry, 36, 1130–1132, 1944); "cannon ball" or particle contact types in which a high concentration of toxicant is used in a relatively water impermeable and insoluble matrix and the toxicant is made available largely by slow dissolution out of the matrix structure (e.g., see Ferry, J. D., and Ketchum, B. H., Industrial and Engineering Chemistry, 38, 806–810, August 1946); and soluble matrix types in which the matrix slowly dissolves thus releasing the toxicant (e.g., see Ketchum, B. H., Berry, J. D., and Burns, A. E., Industrial and Engineering Chemistry, 38, 931–936, September 1946); and modifications of each of these. The vehicles of all marine antifouling paints may be considered to be "permeable" since a degree of permeability is necessary to make the active ingredients initially available at the surface of the paint film (as previously noted). In the particle contact type of paint, however, vehicles which are relatively insoluble in sea water may be used since the major mechanism for making the active ingredients available is through the exposing of new particles of active ingredients by the dissolution of other particles thereof with which they are in contact.

The following examples will illustrate the best mode contemplated for practicing the invention without being limiting thereto, since it is within the skill of the art to prepare further formulations consisting of paint vehicles incorporating triphenylborane complexes as herein defined, following the disclosure herein made.

*Example 1*

A paint mixture is prepared by thoroughly mixing 50 parts by weight of approximately 150 mesh triphenylborane pyridine complex into 100 parts by weight of a marine spar varnish having the following approximate composition:

| | Parts by weight |
|---|---|
| Refined linseed varnish oil | 100 |
| Modified oil-soluble phenolic resin | 125 |
| Gum rosin | 25 |
| Chinawood oil | 390 |
| Pentaerythritol ester gum | 100 |
| Mineral spirits | 425 |
| Terpenoid and aromatic thinner | 265 |
| 6% cobalt drier | 5 |
| 24% lead naphthenate drier | 5 |

For testing, this white paint-like mixture is designated lot 1. For purposes of comparison, a similar mixture is also made using 122 parts of cuprous oxide, a commercially available anti-fouling agent, in place of the 50 parts of triphenylborane pyridine complex in the previously described spar varnish composition. The cuprous oxide containing paint is designated lot 2.

Panels of exterior type plywood are coated with each of the above paint mixtures and a control panel designated lot 3 is coated with the same paint base which contains no toxicant. The paint film of lot 1 contains 49% of toxicant on a dry weight basis as compared to 69% toxicant in lot 2 and 0% toxicant in lot 3 on the same basis. The panels are exposed to fouling conditions by submerging in the sea at Miami, Florida, and are examined at monthly intervals to determine to what extent fouling has occurred.

It is found that lot 1 provides complete protection for at least six months whereas neither of the other two lots provide protection for even one month.

A number of the toxicants within the scope of the present invention are evaluated utilizing the same spar varnish formulation except that the amount of toxicant used is varied. Panels of exterior type plywood coated with the various formulations are exposed to fouling conditions by submersion in the sea at Miami, Florida, and examined at monthly intervals. The numbers of months which the panels retain at least 85 percent antifouling activity are reported in the following table. (The 85% antifouling activity is determined as follows: The number of barnacles, hydroids, bryozoa, oysters, tubeworms, and other macroscopic fouling organisms which adhere to each test panel is counted once each month, and compared with the number of the same types of organisms on a non-toxic plate glass panel of the same area immersed for the same period. The percent antifouling activity is then calculated utilizing the following equation.

$$\text{Percent antifouling activity} = 100 - \frac{100x}{y}$$

where $x$ is the number of fouling organisms on the test panel and $y$ is the number of fouling organisms on the non-toxic control panel.)

| Toxicant | | |
|---|---|---|
| Complex of Triphenyl borane with the following— | Percent Concentration (dry weight) | Months |
| Pyridine | 49 | >10 |
| 3-bromo pyridine | 49 | >6 |
| 4-methyl pyridine (γ-picoline) | 66 | 5 |
| | 49 | 5 |
| 4-ethyl pyridine | 66 | 3 |
| Dodecyl amine | 66 | 2 |
| | 32 | 1 |

Example 2

A modified soluble matrix type paint is prepared by ball milling 50 parts by weight of finely divided triphenylborane pyridine complex with 100 parts of the following vinyl-base coating which meets U.S. Navy specifications for U.S. Navy antifouling paint formula No. 121.

| | Parts by weight |
|---|---|
| Vinyl chloride-vinyl acetate copolymer [1] | 80 |
| Gum rosin | 80 |
| Tricresyl phosphate | 30 |
| Methyl isobutyl ketone | 275 |
| Xylene | 185 |

[1] A copolymer of 87 mole percent vinyl chloride and 13 mole percent vinyl acetate.

This paint mixture, which is white in color, is designated lot 1. If desired, the addition of a suitable pigment mixture to this paint provides a standard grey color. A similar mixture is prepared using 122 parts of cuprous oxide, a commercially available antifouling agent, in place of the 50 parts of triphenylborane pyridine complex in the same vinyl vehicle and this composition is designated lot 2. Panels of exterior type plywood are coated with each of the above paint mixtures. The paint film of lot 1 contains 63% of toxicant on a dry weight basis as compared to 81% toxicant in lot 2. The panels are exposed to fouling conditions by submersion in the sea at Miami, Florida, and are examined at monthly intervals to determine to what extent fouling has occurred. Lot 1 provides complete protection for at least three months while lot 2 is fouled at the end of three months.

A number of other toxicants according to the invention are evaluated using the same vinyl-base coating formulation except that the amount of toxicant is varied. The results of anti-fouling tests on panels coated with these formulations and tested for anti-fouling activity in the manner previously described are given in the following table, the triphenylborane pyridine complex being included for purposes of comparison.

The numbers of months which the panels retain at least 85% antifouling activity are reported.

| Complex of Triphenylborane with the following— | Toxicant concentration (percent dry weight) | Months |
|---|---|---|
| Pyridine | 78 | 14 |
|  | 63 | 13 |
| 3-bromo pyridine | 63 | 1 |
| 4-methyl pyridine (γ-picoline) | 78 | >18 |
|  | 63 | 3 |
| 3-pyridine carboxylic acid amide (nicotinamide) | 63 | 1 |
| Dodecyl amine | 78 | 2 |
| n-Tetradecyl amine | 78 | 2 |

A 15 gallon lot of an antifouling paint according to the present invention having the composition shown in the following table is prepared.

| | Percent by weight |
|---|---|
| Triphenylborane pyridine | 26.00 |
| Vinyl chloride vinyl acetate copolymer [1] | 8.76 |
| Gum rosin | 8.76 |
| Tricresyl phosphate | 3.28 |
| Green phthalocyanine pigment | 1.09 |
| Green pigment [2] | 1.09 |
| Titanium dioxide | 0.58 |
| Bentonite clay | 0.09 |
| Diisobutyl ketone | 30.00 |
| Xylene | 20.35 |
| Total | 100.00 |

[1] "VYHH"; 87 mole percent vinyl chloride and 13 mole percent vinyl acetate.
[2] A green pigment of the iron salt of nitroso beta-naphthol.

This formulation is mixed in a ball mill until a viscosity of approximately 1,000 centipoise is achieved. The resulting paint, which is found to have good characteristics with respect to both brush and roller application, is applied using paint rollers to the below the waterline portion of the wooden hull of a 77 foot motor launch. After drying the film is found to have good mechanical properties, gloss and a pleasing uniform color. After one year of service in subtropical sea waters this paint film is found to be free of fouling, while at the same time it retains a good dark green color and is in excellent condition.

Example 3

A number of the toxicants according to the present invention are evaluated using a vehicle of relatively low water permeability, the finished formulation being of the "cannon ball" or particle contact type of anti-fouling paint. The toxicants are added to a 13 percent solution of "VYHH" vinyl chloride-vinyl acetate copolymer in a solvent consisting of 60 parts of weight of methylisobutylketone and 40 parts of xylene, the relative amounts of toxicant and vehicle being varied as indicated, infra. The results of anti-fouling tests in the sea at Miami, Florida on panels coated with the various formulations in the manner previously described are given in the following table. The number of months which the panels retain at least 85% antifouling activity are reported.

| Toxicant | | |
|---|---|---|
| Complex of Triphenyl borane with the following— | Concentration (percent dry weight) | Months |
| Pyridine | 86 | >18 |
|  | 61 | 5 |
| 4-methyl pyridine (γ-picoline) | 86 | 3 |
|  | 76 | 5 |
| Decylamine | 86 | 9 |
| Dodecylamine | 76 | 1 |
|  | 86 | 5 |
| n-Tetradecyl amine | 86 | 5 |
| Octadecyl amine | 86 | 2 |
|  | 76 | 2 |

The toxicants of the present invention may also be used successfully in soluble-matrix type anti-fouling paints, e.g., of the type disclosed in United States Patent 2,838,419.

Example 4

A red bottom paint having anti-fouling properties is prepared by incorporating (by thorough mixing, repeated before use) 30 parts of approximately 100 mesh powdered triphenylborane pyridine complex into 50 parts of a paint having the following weight percentage composition:

| | |
|---|---|
| Toluidine red pigment | 5.7 |
| Para red pigment | 5.8 |
| Ester gum | 6.0 |
| Phenolic resin | 7.0 |
| Tung oil | 26.3 |
| Linseed oil | 13.0 |
| Mineral spirits | 36.18 |
| Cobalt naphthenate | 0.02 |
| | 100.00 |

The composition is suitable for application to boats by brushing or spraying on the areas exposed to fouling conditions.

Example 5

A white anti-fouling bottom paint is prepared by grinding 43 parts of triphenyborane pyridine and 7.5 parts of titanium dioxide pigment in 100 parts of the spar varnish composition of Example 1. This paint is suitable for application directly to a boat bottom or, if desired, known oil ground pigments may be incorporated to produce colors such as red, green, blue, etc.

*Example 6*

A further advantage of the compositions of the invention is the residual toxicity to marine borers imparted to wooden structures when the triphenylborane-amine complexes hereof are incorporated into paint films applied to them. The effect is clearly shown by the following tests.

A paint is prepared containing 0.5 part of triphenylborane pyridine dispersed in 100 parts of the vinyl base of Example 2. This mixture has low hiding power and is intended to serve only to show the strong residual effect of the toxicant. Two inch square panels ⅜ inch thick of previously uncoated pine wood are coated with the above composition and others with the vinyl base containing no toxicant. After the coatings have dried thoroughly, one-half of each panel is sanded with a power driven sander to remove the coating and expose the surface of the wood. The panels are then immersed as for the fouling test and examined periodically. All panels become encrusted with barnacles within about one month. This effect would of course be expected for the paint containing triphenylborane pyridine in such low concentration. The barnacles are carefully scraped away and the wood is examined with a hand lens for evidence of the characteristic holes created by Teredo and/or Limnoria. These holes are found on the exposed parts of the panels previously coated with the paint not containing toxicant after two months, whereas it is four months before they are found on the exposed portions of the panels previously coated with a paint containing triphenylborane pyridine. It is evident that this effect will enhance the life of wooden vessels which have been subjected to abrasion against piers or floating objects. Compositions of the invention containing about 25 percent or more of triphenylborane pyridine exhibit a residual effect for much longer than the period illustrated by this example.

As a further demonstration of the inhibiting effects on marine borers of the complexes of triphenylborane with amines as described herein, a two inch square panel of ⅜ inch thick uncoated pine wood is immersed in a five percent solution of triphenylborane pyridine in pyridine solvent, and is subjected to a vacuum of 30 to 60 mm. mercury pressure for one to two hours, after which the sample is returned to atmospheric pressure. The sample is dried at room temperature, immersed as for the fouling test, and examined once each month for eleven months for the presence of borers as described above. The sample remains completely free of all borers at the end of eleven months, at which time the test is terminated.

The terms and expressions which have been employed are used as terms of description and not of limitation, and it is not intended, in the use of such terms and expressions, to exclude any equivalence of the features shown and described or portions thereof, but it is recognized that various modifications are possible within the scope of the invention claimed.

What is claimed is:
1. A marine anti-fouling composition comprising, in admixture, a permeable marine paint and, as an active ingredient, an effective amount not less than about 25% by weight of a complex of triphenylborane with a compound selected from the group consisting of heterocyclic amines of the formula

wherein $R_1$ is selected from the class consisting of meta and para oriented hydrogen, halogen, lower alkyl containing not more than 4 carbon atoms, carbonamide and heterocyclic groups, and aliphatic amines of the formula $$R_2NH_2$$

wherein $R_2$ is an aliphatic hydrocarbon group containing from four to twenty carbon atoms.

2. A marine anti-fouling composition comprising, in admixture, a permeable marine paint and, as an active ingredient, an effective amount not less than about 25% by weight of a complex of triphenylborane with a heterocyclic amine of the formula

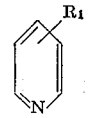

wherein $R_1$ is selected from the class consisting of meta and para oriented hydrogen, halogen, lower alkyl containing not more than 4 carbon atoms, carbonamide and heterocyclic groups.

3. A marine anti-fouling composition comprising, in admixture, a permeable marine paint and, as an active ingredient, an effective amount not less than about 25% by weight of a complex of triphenylborane with an aliphatic amine of the formula $$R_2NH_2$$

wherein $R_2$ is an aliphatic hydrocarbon group containing from four to twenty carbon atoms.

4. A marine anti-fouling composition comprising, in admixture, a permeable marine paint and an effective amount not less than about 25% by weight of pyridine complex of triphenylborane.

5. A marine anti-fouling composition comprising a substantially water-insoluble, film-forming vehicle containing from about 25 to 50% by weight of the pyridine complex of triphenylborane.

6. A marine anti-fouling composition comprising, as a vehicle, spar varnish; and incorporated therein in finely divided form, from about 25 to 50% by weight of the pyridine complex of triphenylborane.

7. A marine anti-fouling composition as defined in claim 1 wherein the active ingredient is the 3-bromo pyridine complex of triphenylborane.

8. A marine anti-fouling composition as defined in claim 1 wherein the active ingredient is the 4-methyl pyridine complex of triphenylborane.

9. A marine anti-fouling composition as defined in claim 1 wherein the active ingredient is the decyl amine complex of triphenylborane.

References Cited by the Examiner

UNITED STATES PATENTS 3,062,708  11/62  Updegraff _____ 167—38.6

FOREIGN PATENTS 460,794  11/49  Canada.
2,221  1862  Great Britain.

OTHER REFERENCES

Gardner, Toxic Compositions to Prevent the Fouling of Steel Ships and to Preserve Wood Bottoms, Scientific Section, Educational Bureau, Paint Manufacturers' Association of the U.S., Circular No. 259, January, 1926, pages 232–270 (pages 232, 233, 240, 241, and 264–270 relied upon).

N. V. Sidgwick, The Chemical Elements and Their Compounds, volume I, Oxford University Press, London, 1950, pages 400–401 relied upon.

Callery Chemicals Technical Bulletin C–200, "The Amine-Boranes," published by Callery Chemical Co., Marketing Division, 9600 Perry Highway, Pittsburgh 37, Pennsylvania, August 1, 1957.

LEON J. BERCOVITZ, *Primary Examiner.*

MILTON STERMAN, *Examiner.*